(12) United States Patent
Heo

(10) Patent No.: US 8,373,823 B2
(45) Date of Patent: Feb. 12, 2013

(54) LIQUID CRYSTAL DISPLAY DEVICE

(75) Inventor: Jong Gu Heo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 100 days.

(21) Appl. No.: 12/872,715

(22) Filed: Aug. 31, 2010

(65) Prior Publication Data

US 2011/0141400 A1  Jun. 16, 2011

(30) Foreign Application Priority Data

Dec. 10, 2009  (KR) .......................... 10-2009-0122494

(51) Int. Cl.
*G02F 1/1335* (2006.01)
*G09F 13/04* (2006.01)

(52) U.S. Cl. .............................. 349/65; 349/56; 362/97.1

(58) Field of Classification Search .................... 349/19, 349/20, 21, 56, 58, 158, 65; 362/97.1, 97.2, 362/97.3, 97.4
See application file for complete search history.

(56) References Cited

U.S. PATENT DOCUMENTS

| | | | |
|---|---|---|---|
| 7,798,694 B2 * | 9/2010 | Hwang | 362/560 |
| 7,832,916 B2 * | 11/2010 | Kawato et al. | 362/633 |
| 2007/0091636 A1 * | 4/2007 | Hwang | 362/600 |
| 2007/0229995 A1 * | 10/2007 | Kawato et al. | 359/883 |
| 2009/0096953 A1 * | 4/2009 | Tanaka | 349/61 |
| 2009/0268434 A1 * | 10/2009 | Mita et al. | 362/97.1 |
| 2009/0316064 A1 * | 12/2009 | Kono et al. | 349/58 |
| 2011/0141400 A1 * | 6/2011 | Heo | 349/65 |
| 2012/0081895 A1 * | 4/2012 | Mita et al. | 362/235 |

FOREIGN PATENT DOCUMENTS

KR  100879772 B1  1/2009

OTHER PUBLICATIONS

Office Action issued in corresponding Korean Application No. 10-2009-0122494, mailed Sep. 28, 2012.
Office Action issued in corresponding Chinese Patent Application No. 201010578266.6, mailed Nov. 5, 2012.

* cited by examiner

*Primary Examiner* — Brian Healy
(74) *Attorney, Agent, or Firm* — Brinks Hofer Gilson & Lione

(57) ABSTRACT

An LCD device is disclosed. The disclosed LCD device includes: a liquid crystal display panel configured to display images; a backlight unit configured to include a light source provided for emitting light and optical sheets provided for improving optical characteristics of light which is emitted by the light source; a bottom cover with a receiving portion configured to receive the liquid crystal display panel and the backlight unit; and a heat guide member disposed on a front surface of the receiving portion of the bottom cover and configured to guide the heat generated in the light source toward the liquid crystal display panel.

5 Claims, 4 Drawing Sheets

LIQUID CRYSTAL DISPLAY DEVICE

This application claims the benefit of Korea Patent Application No. 10-2009-0122494, filed on Dec. 10, 2009, the entire contents of which is incorporated herein by reference for all purposes as if fully set forth herein.

BACKGROUND

1. Field of the Invention

This disclosure relates to a liquid crystal display (LCD) device, and more particularly to an LCD device adapted to minimize motion blurring phenomena and to reduce a response time of liquid crystal by increasing the temperature of an LCD panel.

2. Discussion of the Related Art

Cathode ray tubes (CRTs) are one type of display devices, which are widely used. The CRTs are mainly used as monitors for TVs, measuring apparatuses, information terminals, and others. However, the heavy weight and large size of the CRTs have been a major hindrance to the manufacturing of small, light electronic products.

As a substitute for such CRTs, LCD devices are actively being researched, which have features of small size, light weight, low power consumption, etc. LCD devices have been developed enough to be employed as flat display devices. LCD devices are used in monitors for laptop computers, desktop computers, large-sized information equipment, or others. Moreover, demand for the LCD device is continuously increasing.

LCD devices are display devices of a light receiving type which control the light quantity from the exterior and display images. As such, the LCD devices must include a separated light source unit which is called "a backlight unit" configured to irradiate light to an LCD panel. Such a backlight unit can be classified as either an edge type or a direct type in accordance with the disposition of a light source.

The edge type backlight unit includes a light source disposed at an edge of the LCD panel, a light guide plate and optical sheets which are configured to guide incident light from the light source to the LCD panel. On the other hand, the direct type backlight unit includes a plurality of light sources arranged directly under the LCD panel and optical sheets configured to pass light from the light sources to the LCD panel.

With respect to the backlight unit, trials have been recently made to employ light emission diodes (LEDs) with the features of long lifespan, light weight, superior color temperature characteristics, or others, as a light source. However, the performance of the LEDs must be deteriorated due to a temperature increment caused by internally generated heat. As such, the LEDs can not provide high efficiency and long enough lifespan to meet a desired degree. To solve this matter, a variety of cooling methods have been proposed for the backlight unit with employing the LEDs.

The proposed cooling methods all use a metal plate being in contact with the LEDs as a heat radiation plate, in order to discharge heat generated in the LEDs. However, it is difficult to reduce heat resistance of the backlight unit with the LEDs below a critical value only using the metal plate. Moreover, when the design specifications of an LCD device, such as size of an LCD panel, arrangement of the LEDs, or others are changed, it is more difficult to decrease the heat resistance of the backlight unit below the critical degree.

BRIEF SUMMARY

An LCD device includes: a liquid crystal display panel configured to display images; a backlight unit configured to include a light source provided for emitting light and optical sheets provided for improving optical characteristics of light which is emitted by the light source; a bottom cover with a receiving portion configured to receive the liquid crystal display panel and the backlight unit; and a heat radiation layer formed on a rear surface of the bottom cover and configured to externally discharge the heat generated in the light source.

An LCD device according to another aspect includes: a liquid crystal display panel configured to display images; a backlight unit configured to include a light source provided for emitting light and optical sheets provided for improving optical characteristics of light which is emitted by the light source; a bottom cover with a receiving portion configured to receive the liquid crystal display panel and the backlight unit; and a heat guide member disposed on a front surface of the receiving portion of the bottom cover and configured to guide the heat generated in the light source toward the liquid crystal display panel.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
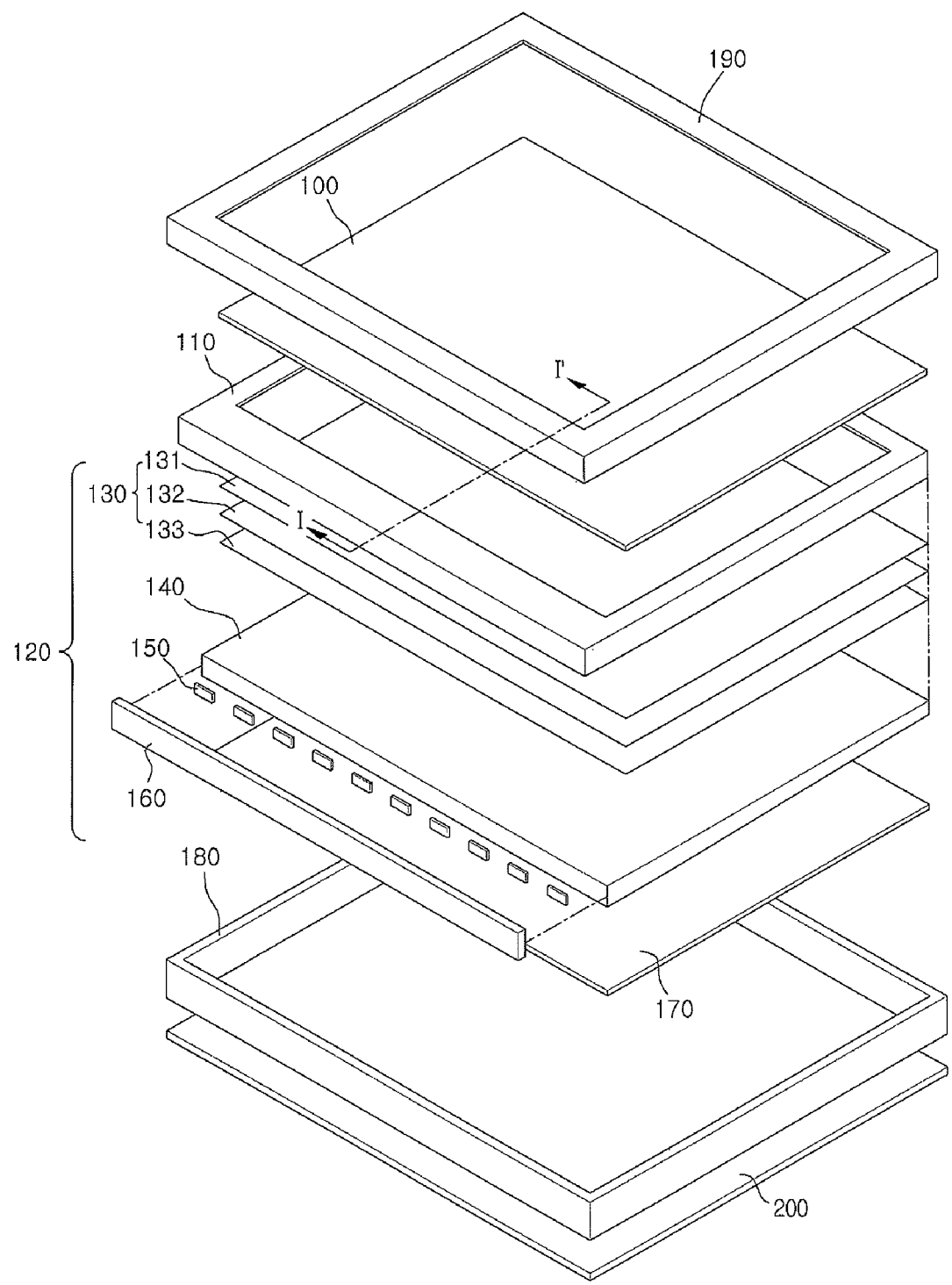
FIG. 1 is a disassembled perspective view showing an LCD device according to a first embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
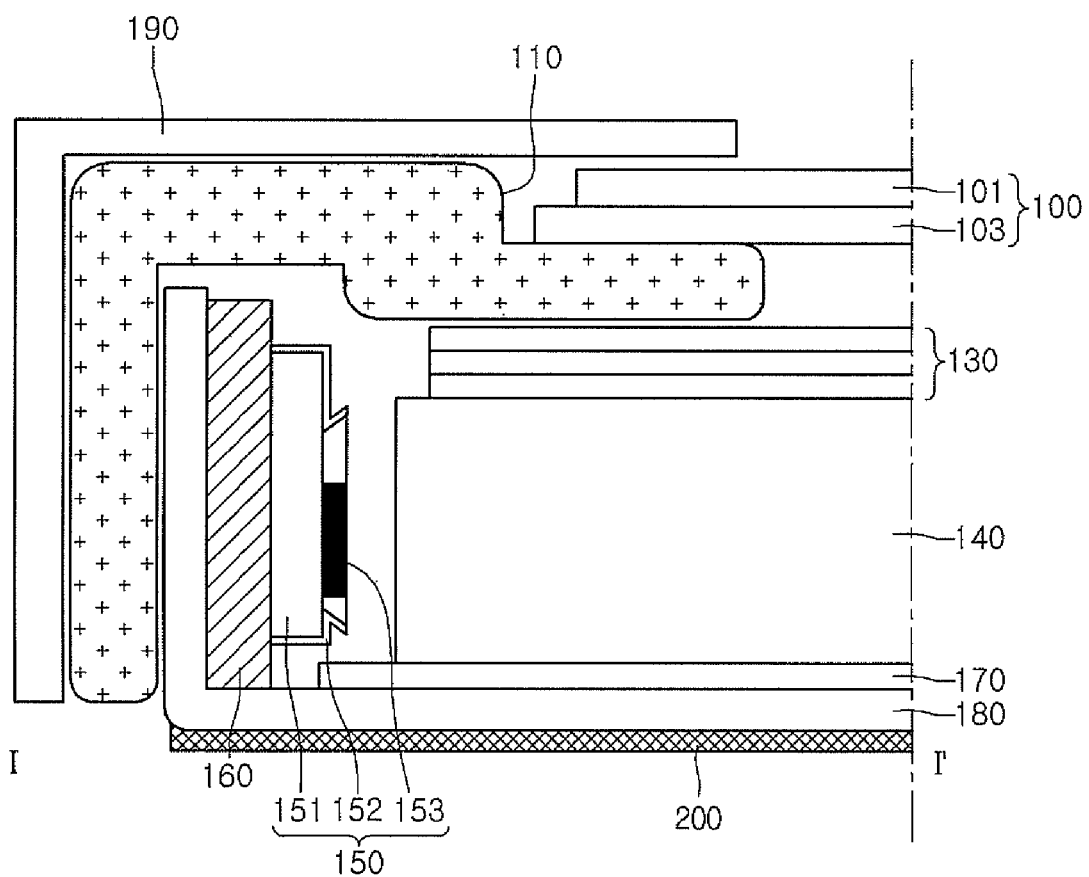
FIG. 2 is a cross-sectional view showing the cross-sectional structure of an LCD device taken along a line I-I' in FIG. 1.

FIG. 1 is a disassembled perspective view showing an LCD device according to a first embodiment of the present disclosure. FIG. 2 is a cross-sectional view showing the cross-sectional structure of an LCD device taken along a line I-I' in FIG. 1.

Referring to FIGS. 1 and 2, an LCD device according to a first embodiment of the present disclosure includes an LCD panel 100 configured to display images, support main 110 configured to support edges of the LCD panel 100, and a backlight unit 120 disposed on the rear surface of the LCD panel 100 and configured to apply light to the rear surface of the LCD panel 100. The LCD device further includes a bottom cover 180 configured to receive the LCD panel 100 and the backlight unit 120, and a top case 190 configured to encompass edge portions of the bottom cover 180.

The LCD panel 100 includes a color filter substrate 101 and a thin film transistor array substrate 103 disposed opposite each other and combined to maintain a uniform cell gap between them, as well as a liquid crystal layer (not shown) interposed between the two substrates 101 and 103. The thin film transistor array substrate 103 includes a plurality of gate lines and a plurality of data lines formed to cross each other, and a plurality of thin film transistors TFT formed at the intersections of the plurality of gate and data lines. The plurality of gate and data lines crossing each other to define the pixels. The thin film transistors TFT are connected to pixel electrodes each included in the pixels, respectively. On the other hand, the color filter substrate 101 includes: red, green, and blue color filters opposite to the pixels; a black matrix rimmed each of the color filters; and a common electrode formed to cover the color filters and the black matrix. The black matrix shields the gate lines, the data lines, and the thin film transistors TFT.

The LCD device still further includes a gate driver (not shown) and a data driver (not shown) disposed by the sides of the LCD panel 100. The gate driver is connected to the gate lines, in order to sequentially apply a scan signal to the gate lines on the LCD panel 100. The data driver is connected to the data lines, in order to apply data signals to the data lines on the LCD panel 100. Such gate and data drivers are attached to the LCD panel 100 by means of tabs which are configured in a tape carrier package (TCP).

In this manner, the scan and data signals are applied from the gate and data drivers, which are electrically connected with the LCD panel 100, to the plurality of gate lines and the plurality of data lines on the LCD panel 100. Therefore, the pixels on the LCD panel 100 are driven.

The backlight unit 120 disposed under the LCD panel 100 is placed inside a box-shaped bottom cover 180 with an opened upper surface. This backlight unit 120 includes a printed circuit board (PCB) 160 disposed on an inner side surface of the bottom cover 180, and a plurality of LED packages 150 loaded on the PCB 160. The backlight unit 120 further includes a light guide plate 140 disposed parallel to the plurality of LEDs 150, a reflection sheet 170 disposed under the light guide plate 140, and optical sheets 130 disposed over the light guide plate 140. The light guide plate 140 is configured to convert spotted incident lights into two-dimensional light. The reflection sheet 170 reflects light progressing downwardly from the light guide plate 140 toward the LCD panel 100. The optical sheets 130 scatter and converge light entering from the light guide plate 140.

The light guide plate 140 must be formed not to deform and break. To this end, the light guide plate 140 is formed from a material with high hardness (or high strength) and superior transmittance. For example, the light guide plate 140 can be formed from polymethylmethacrylate (PMMA).

The optical sheets 130 include a diffusion sheet 133, a convergent sheet 132, and a protective film 131. The diffusion sheet 133 is configured to scatter light. The convergent sheet 132 is configured to converge the scattered light. The protective sheet 131 is configured to protect convergent patterns which are formed on the convergent sheet 132.

The plurality of LED packages 150 each include an LED chip 153 configured to emit light, a body portion 151 configured to support the LED chip 153, and a mold member 152 configured to encompass edges of the LED chip 153 and body portion 151. Such LED packages 150 are arranged at a fixed interval on the PCB 160 which is formed from a metal material.

The LED chip 153 can include at least one LED configured to emit white light. Alternatively, the LED chip 153 can include either a combination of LEDs configured to emit red, green, and blue lights, or another combination of LEDs configured to emit white, red, green, and blue lights.

The mold member 152, as a molded structure formed from a resin material, is formed in a single body united with the LED chip 153. Also, the mold member 152 is formed to expose a light emission surface of the LED chip 153.

The LCD device further still includes a heat radiation layer 200 coated on the rear surface of the bottom cover 180. The heat radiation layer 200 functions to distribute heat generated in the plurality of LED chips 153 to the exterior of the LCD device. More specifically, heat generated in the plurality of LED chips 153 is conducted to the heat radiation layer 200 via the PCB 160 and bottom cover 180 and is distributed to the exterior of the LCD device by means of the heat radiation layer 200 which is formed on the entire rear surface of the bottom cover 180. As such, the internal temperature increment of the LCD device can be suppressed. Such a heat radiation layer 200 is formed by coating a silicon-based material on the entire rear surface of the bottom cover 180.

In general, ordinary LCD devices must be combined with a separated screen case, in order to provide a finished product such as a portable computer, a monitor for a desktop computer, or others. At this time, the screen case is combined with the ordinary LCD device in such a manner as to encompass the ordinary LCD device. Due to this, although heat generated in the plurality of LED chips 153 is discharged to the exterior of the bottom cover 180, it can not be radiated toward the exterior of the finished product by the screen case encompassing the bottom cover 180. In other words, the heat to be discharged from the ordinary LCD device to the exterior of the finished product is shielded by the screen case. As such, the heat radiation effect of the ordinary LCD device deteriorates.

Unlike the ordinary LCD devices, the LCD device according to the present disclosure forces the heat radiation layer 200 to be brought in close contact with the screen case, when the LCD device is combined with the screen case. As such, heat generated in the plurality of LED chips 153 is discharged to the exterior of the finished product via the PCB 160, bottom cover 180, heat radiation layer 200, and the screen case. Therefore, the LCD device can maximize the heat radiation effect.

Figure 3:
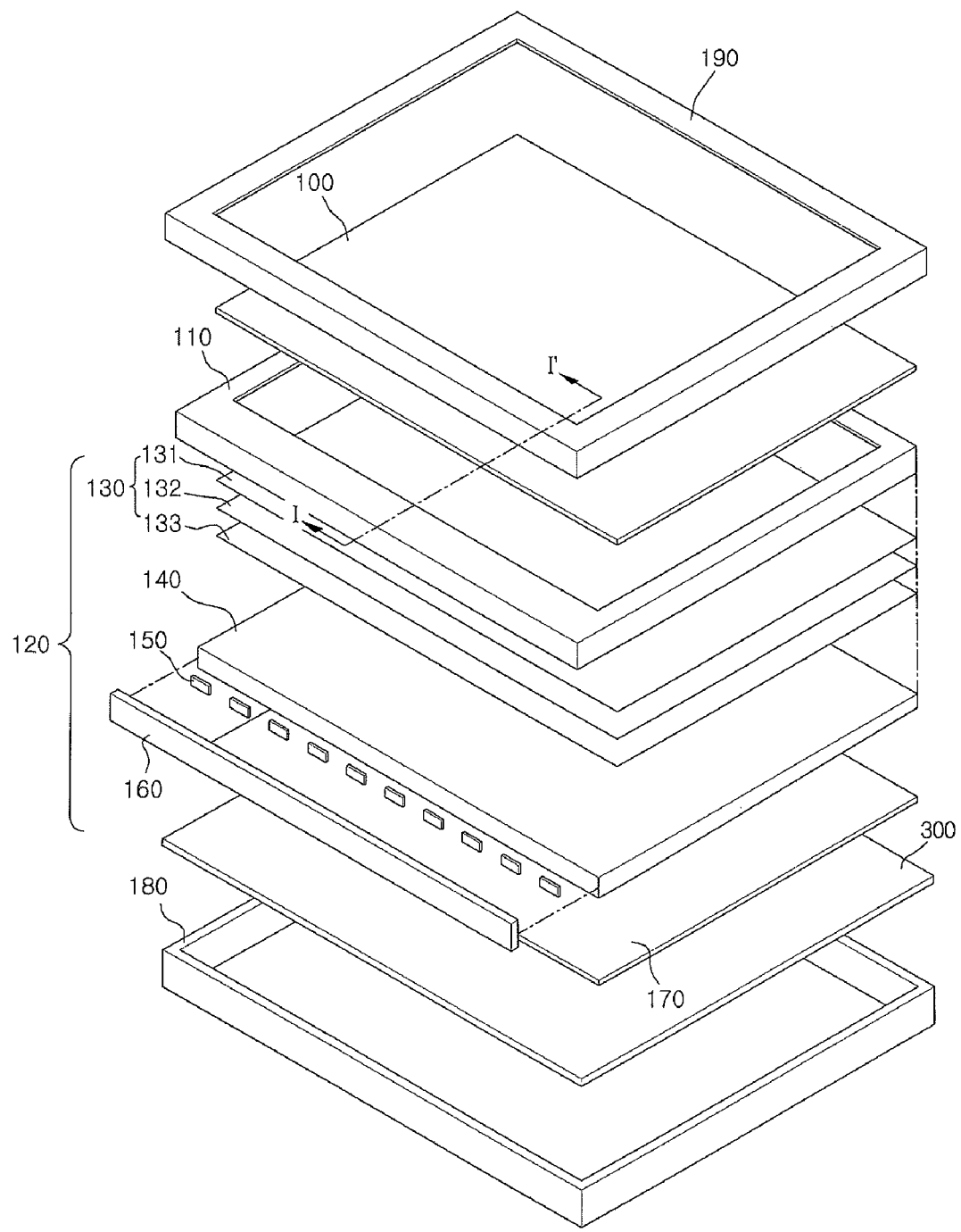
FIG. 3 is a disassembled perspective view showing an LCD device according to a second embodiment of the present disclosure.
Figure 4:
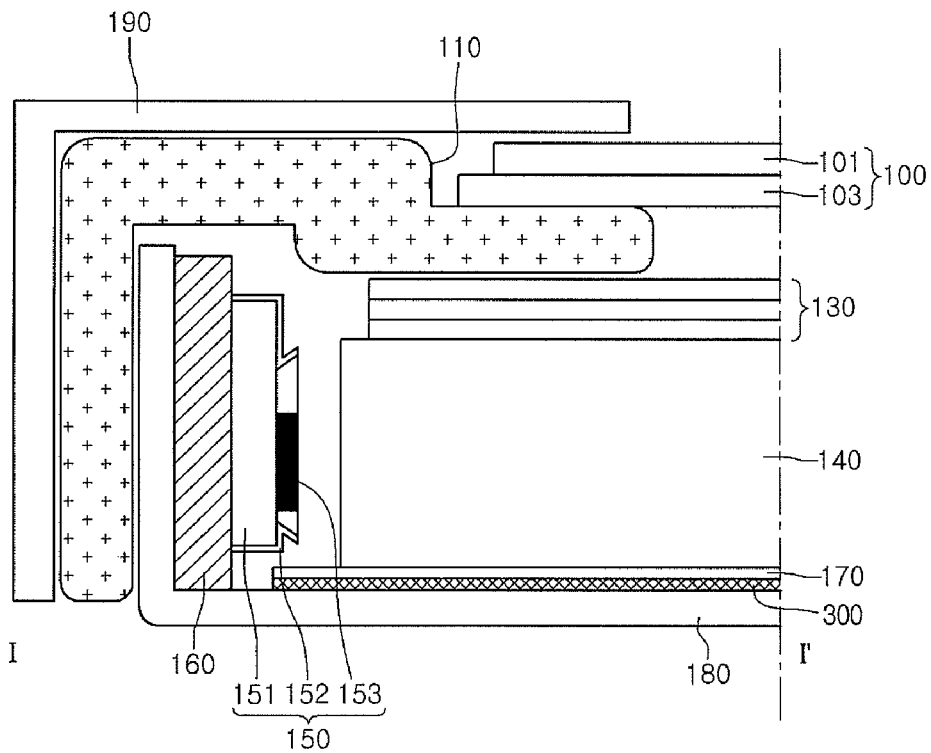
FIG. 4 is a cross-sectional view showing the cross-sectional structure of an LCD device taken along a line I-I' in FIG. 3.

FIG. 3 is a disassembled perspective view showing an LCD device according to a second embodiment of the present disclosure. FIG. 4 is a cross-sectional view showing the cross-sectional structure of an LCD device taken along a line I-I' in FIG. 3.

For convenience of explanation, components of FIGS. 3 and 4 with the same as those of FIGS. 1 and 2 will be briefly described.

As shown in FIGS. 3 and 4, an LCD device according to a second embodiment of the present disclosure includes an LCD panel 100 configured to display images, support main 110 configured to support edges of the LCD panel 100, and a backlight unit 120 disposed on the rear surface of the LCD panel 100 and configured to apply light to the rear surface of the LCD panel 100. The LCD device further includes a bottom cover 180 configured to receive the LCD panel 100 and the backlight unit 120, and a top case 190 configured to encompass edge portions of the bottom cover 180.

The LCD panel 100 is disposed above the backlight unit 120 and configured to display images using light applied from the backlight unit 120. Gate and data drivers (not shown) are electrically connected to edges of the LCD panel 100.

The LCD panel 100 includes a thin film transistor array substrate 103 and a color filter substrate 101 combined opposite each other. The LCD device further includes a liquid crystal layer (not shown) interposed between the two substrates 101 and 103.

The thin film transistor array substrate 103 includes a plurality of pixels arranged in a matrix shape. Each of the pixels includes a pixel electrode formed on each region which is defined by crossing gate and data lines electrically insulated from each other. The gate lines are arranged to extend in a first direction, and the data lines are arranged to extend in a second direction perpendicular to the first direction. Also, each pixel further includes a thin film transistor TFT connected to a respective gate line, a respective data line, and a respective pixel electrode.

The color filter substrate 101 includes red, green, and blue color filters (not shown) opposite to each of the pixels. The color filters are formed on the color filter substrate 101 by performing a thin film forming process. The color filter substrate further includes a common electrode formed opposite to all the pixel electrodes. The common electrode and the pixel electrodes enable the molecular alignment of the liquid crystal layer to be changed when voltages are applied to the common and pixel electrodes. In accordance therewith, the transmittance of light applied from the backlight unit 120 is adjusted.

The backlight unit 120 includes a printed circuit board (PCB) 160 disposed on an inner side surface of the bottom cover 180, and a plurality of LED packages 150 loaded on the PCB 160. The backlight unit 120 further includes a light guide plate 140 disposed parallel to the plurality of LEDs 150, a reflection sheet 170 disposed under the light guide plate 140, and optical sheets 130 disposed over the light guide plate 140. The light guide plate 140 is configured to convert spotted incident lights into two-dimensional light. The reflection sheet 170 reflects lights progressing downwardly from the light guide plate 140 toward the LCD panel 100. The optical sheets 130 scatter and converge light entering from the light guide plate 140.

The plurality of LED packages 150 each includes a LED chip 153, a body portion 151, and a mold member 152. The LED chip is configured to emit light. The body portion 151 is configured to support the LED chip 153. The mold member 152 is formed to encompass edges of the LED chip 153 and body portion 151.

Moreover, the backlight unit 120 includes a heat radiation film 300 interposed between the reflection sheet 170 and the bottom surface of the bottom cover 180. The heat radiation film 300 is formed by coating a heat radiation material on the entire bottom surface of the bottom cover 180. For example, the heat radiation film 300 can be formed from a silicon-based material.

The heat radiation film 300 minimizes heat to be discharged outwardly from the bottom surface of the bottom cover 180. Instead, the heat radiation film 300 functions to guide the heat, which is generated in the plurality of LED chips 153, then is conducted to the bottom surface of the bottom cover 180 through the PCB 160, toward the LCD panel 100. In accordance therewith, although the screen case combined with the LCD device restrains the external discharging of heat, the heat radiation effect of the LCD device according to the second embodiment dies not deteriorate. This results from the fact that the heat generated in the plurality of LED chips 153 is almost completely absorbed or radiated outwardly by the LCD panel 100.

The heat generated in the plurality of LED chips 153 is applied to the LCD panel 100 by the radiating function of the heat radiation film 300, thereby causing the internal temperature of the LCD panel 100 to rise. In accordance therewith, the response time of liquid crystal molecules within the LCD panel 100 can be improved, and furthermore the generation of motion blurring phenomena in images, which are displayed on the LCD panel 100, can be minimized.

Figure 5:
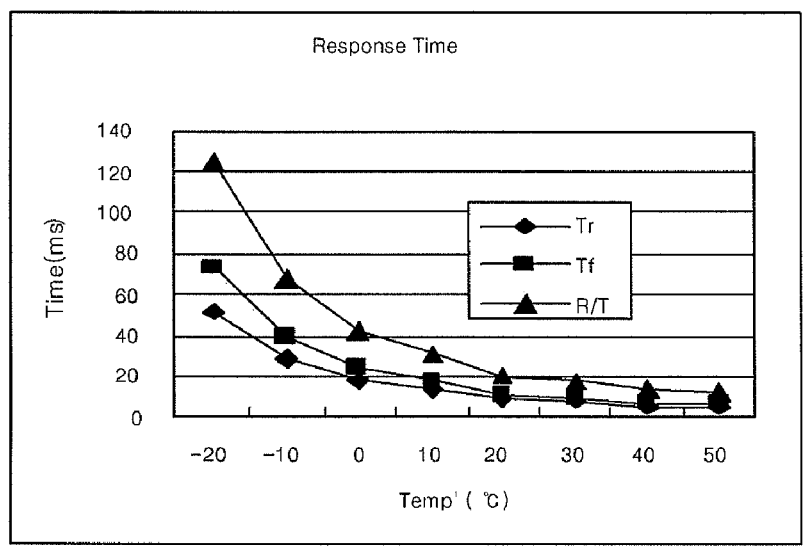
FIG. 5 is a graphic diagram illustrating response characteristics of liquid crystal layer in accordance with the internal temperature of an LCD panel.

FIG. 5 is a graphic diagram illustrating response characteristics of liquid crystal layer in accordance with the internal temperature of an LCD panel.

As seen from FIG. 5, it is evident that the higher the internal temperature of the LCD panel 100 the more the response time, rising time, and falling time of the liquid crystal are reduced. If the internal temperature of the LCD panel 100 is at about −20° C., the rising time and falling time of the liquid crystal are 51.7 ms and 76.3 ms, respectively. Also, when the internal temperature of the LCD panel 100 is at about 50° C., the rising time and falling time of the liquid crystal each are 5.2 ms and 6.7 ms.

In order to realize a motion picture, several tens of image frames are displayed every second. To this end, the liquid crystal molecules within the liquid crystal layer receive an electric field varying as the number of image frames. In this case, the delayed response of the liquid crystal molecule increases the residual images, thereby causing the motion blurring phenomenon. However, if the internal temperature of the LCD panel 100 becomes higher, the reaction time of the liquid crystal molecule within the liquid crystal layer is reduced. As a result, the motion blurring phenomenon can be reduced.

Moreover, it is regulated for LCD devices to maintain the temperature of the LED chip below 70° C. when the LED chip generates heat, in order to secure the reliability of the LED chip. However, the LED chip 153 included in the LCD device of the second embodiment maintains the temperature of about 55° C. when it emits light. Therefore, the LCD device can not only minimize the motion blurring phenomenon, but also satisfy the reliability regulation of the LED chip.

As described above, the LCD device according to the present disclosure allows the heat radiation film 300 to be coated on the bottom surface of the bottom cover 180 as a part of heat guide path configured to guide the heat generated in the plurality of LED chips toward the LCD panel. In accordance therewith, although the screen case combined with the LCD device restrains the external discharging of heat, the LCD device can prevent the deterioration of a heat radiation effect.

Also, the LCD device according to the present disclosure applies the heat generated in the plurality of LED chips 153 toward the LCD panel 100 using the heat radiation film 300, thereby raising the temperature of the LCD panel to a fixed degree. As such, the response time of the liquid crystal can be reduced, and furthermore the motion blurring phenomenon can be minimized.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A liquid crystal display device comprising:
   a liquid crystal display panel configured to display images;
   a backlight unit configured to include a light source provided for emitting light and optical sheets provided for improving optical characteristics of light which is emitted by the light source;
   a bottom cover with a receiving portion configured to receive the liquid crystal display panel and the backlight unit; and
   a heat guide member disposed on a front surface of the receiving portion of the bottom cover and configured to guide the heat generated in the light source toward the liquid crystal display panel,
   wherein the heat guide member is formed from a silicon-based material,
   wherein the light guide member is configured to minimize an external discharging of the heat generated in the light source.

2. The liquid crystal display device claimed as claim 1, wherein the heat generated in the light source is applied to the liquid crystal display panel by the heat guide member in order to raise the temperature of the liquid crystal display panel to a fixed degree.

3. The liquid crystal display device claimed as claim 1, wherein the light source includes at least one light emission diode.

4. The liquid crystal display device claimed as claim 3, wherein the at least one light emission diode is mounted on a printed circuit board.

5. The liquid crystal display device claimed as claim 1, wherein the heat guide member formed on the entire front surface of the bottom cover.

* * * * *